(12) United States Patent
Wallace

(10) Patent No.: US 11,945,411 B2
(45) Date of Patent: Apr. 2, 2024

(54) VEHICLE CARGO CARRIER DEVICE

(71) Applicant: Leonard O. Wallace, Coeur d'Alene, ID (US)

(72) Inventor: Leonard O. Wallace, Coeur d'Alene, ID (US)

(*) Notice: Subject to any disclaimer, the term of this patent is extended or adjusted under 35 U.S.C. 154(b) by 21 days.

(21) Appl. No.: 17/881,973

(22) Filed: Aug. 5, 2022

(65) Prior Publication Data
US 2023/0079766 A1     Mar. 16, 2023

Related U.S. Application Data

(60) Provisional application No. 63/243,473, filed on Sep. 13, 2021.

(51) Int. Cl.
*B60R 9/06* (2006.01)

(52) U.S. Cl.
CPC ..................... *B60R 9/06* (2013.01)

(58) Field of Classification Search
CPC ........................................... B60R 9/06
USPC ........................................... 224/519
See application file for complete search history.

(56) References Cited

U.S. PATENT DOCUMENTS

| | | | |
|---|---|---|---|
| 4,640,658 A * | 2/1987 | Webb, Jr. ............. | A61G 3/0209 224/523 |
| 4,676,413 A | 6/1987 | Began et al. | |
| 4,915,276 A * | 4/1990 | Devito ............... | B60R 9/06 224/500 |
| 4,957,228 A | 9/1990 | Balka | |
| 5,215,234 A * | 6/1993 | Pasley ............. | B60R 9/06 224/508 |
| 5,224,636 A * | 7/1993 | Bounds ............. | B60R 9/06 224/521 |
| 5,460,304 A | 10/1995 | Porter et al. | |
| 5,749,506 A * | 5/1998 | Davies ............. | B60R 9/06 224/501 |
| 5,904,281 A | 5/1999 | Mooers | |
| 9,550,444 B1 * | 1/2017 | Ferreira ............. | B60P 3/077 |
| 11,034,282 B2 * | 6/2021 | Barlow ............. | B60D 1/52 |

(Continued)

OTHER PUBLICATIONS

NPL_Cite_1: Website available at least as early as Jul. 19, 2021 at: https://caautoparts.com/products/cargo-box-pt-ztl-8004?currency=USD&variant=917870772252&utm_medium=cpc&utm_source=google&utm_campaign=Google%20Shopping&gclid=EAlalQobChMlufmHh9fl8QIVJgaICR1PAwLOEAkYASABEgI8AvD_BWE.

*Primary Examiner* — Peter N Helvey
(74) *Attorney, Agent, or Firm* — PatentFile, LLC; Bradley C. Fach; Steven R. Kick

(57) ABSTRACT

A vehicle cargo carrier device may include first support platform and a second support platform which may be coupled together via a connection bar. The first support platform may also be coupled to a first vertical support arm, and the second support platform may also be coupled to a second vertical support arm. A first arm bracket may couple the first vertical support arm to a first portion of a vehicle, such as to a first support arm of a vehicle hitch receiver that is coupled to the rear vehicle frame, and a second arm bracket may couple the second vertical support arm to a second portion of the vehicle, such as to a second support arm of the vehicle hitch receiver that is coupled to the rear vehicle frame. Preferably, the arm brackets may be coupled to the vehicle so that the arm brackets are positioned apart from the geometric centerline of the vehicle and any hitch receiver that may be coupled to the center of the vehicle.

20 Claims, 7 Drawing Sheets

(56) References Cited

U.S. PATENT DOCUMENTS

| | | | |
|---|---|---|---|
| 11,718,241 B2 * | 8/2023 | Schulz | B60R 9/06 |
| | | | 224/505 |
| 2010/0001029 A1 | 1/2010 | Tai | |
| 2015/0321620 A1 | 11/2015 | Lungershausen et al. | |
| 2023/0234517 A1 * | 7/2023 | Brown | B60R 9/06 |
| | | | 224/519 |

* cited by examiner

VEHICLE CARGO CARRIER DEVICE

CROSS REFERENCE TO RELATED APPLICATIONS

This application claims priority to and the benefit of the filing date of U.S. Provisional Application No. 63/243,473, filed on Sep. 13, 2021, entitled "VEHICLE CARGO CARRIER DEVICE", which is hereby incorporated by reference in its entirety.

FIELD OF THE INVENTION

This patent specification relates to the field of vehicle cargo carriers. More specifically, this patent specification relates to a vehicle cargo carrier device which does not block access to hitch receivers and rear access doors commonly found on vehicles.

BACKGROUND

Hitch cargo carriers are a product of necessity, i.e., utilizing a centrally located trailer hitch receiver for support and allowing for transport of items, such as gas cans (or anything you don't want inside a vehicle), excess luggage, camping gear, bulky or inconvenient items (bicycles, lawn mowers, wheel chair, tents, etc.

Currently existing hitch cargo carriers are secured to a vehicle via engagement with the vehicle's hitch receiver. Unfortunately, existing hitch cargo carriers restrict/block access to rear access doors commonly found on vehicles, such as vehicle trunks, rear hatches, tailgates, etc. Also, by utilizing a vehicle's receiver hitch for support, hitch cargo carriers block the intended use of the receiver by preventing a hitch from being coupled to the receiver. While others have made obvious attempts at solving these drawbacks, such as swing-away carriers, fold-up carriers, and carriers with ramps, these carriers tend to be bulky, limited in capacity, and/or awkward to attach and detach from the vehicle.

Therefore, a need exists for novel vehicle cargo carriers and devices. A further need exists for novel vehicle cargo carrier devices which do not block access to hitch receivers and rear access doors commonly found on vehicles.

BRIEF SUMMARY OF THE INVENTION

A vehicle cargo carrier device is provided. The device may be coupled to any portion of a vehicle, such as to the rear vehicle frame, preferably by being coupled to support arms of a vehicle hitch receiver that is coupled to the rear vehicle frame, and enables and facilitates access to rear access doors commonly found on vehicles, such as vehicle trunks, rear hatches, tailgates, etc., while simultaneously functioning as an additional load/cargo carrier and functioning to allow for the concurrent use of a receiver hitch on vehicles.

In some embodiments, the device may include a first support platform, having at least one first support surface, and a second support platform, having at least one second support surface. A first arm bracket may be configured to be coupled to a first portion of a vehicle, such as to a first portion of the vehicle frame and/or to support arms of a vehicle hitch receiver that is coupled to the rear vehicle frame, and a first vertical support arm may couple the first arm bracket to the first support platform. A second arm bracket may be configured to be coupled to a second portion of the vehicle, such as to a second portion of the vehicle frame and/or to support arms of a vehicle hitch receiver that is coupled to the rear vehicle frame, and a second vertical support arm may couple the second arm bracket to the second support platform. A connection bar may be coupled to both the first support platform and the second support platform. Optionally, the support platforms may be removably coupled to their respective vertical support arms.

In further embodiments, the arm brackets may be coupled to the vehicle so that the arm brackets are positioned apart from the geometric centerline of the vehicle and any hitch receiver that may be coupled to the geometric centerline of the vehicle so that the support platforms may be separated from each other by a separation distance.

In further embodiments, the connection bar may be adjustable in length so as to allow the arm brackets to be coupled various distances from the center of the vehicle and from any hitch receiver that may be coupled to center of the vehicle.

In further embodiments, the connection bar may include a first bar section and a second bar section, and a portion of the first bar section may be slidably received in a portion of the second bar section in a telescoping manner.

BRIEF DESCRIPTION OF THE DRAWINGS

Some embodiments of the present invention are illustrated as an example and are not limited by the figures of the accompanying drawings, in which like references may indicate similar elements and in which.

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Figure 1:
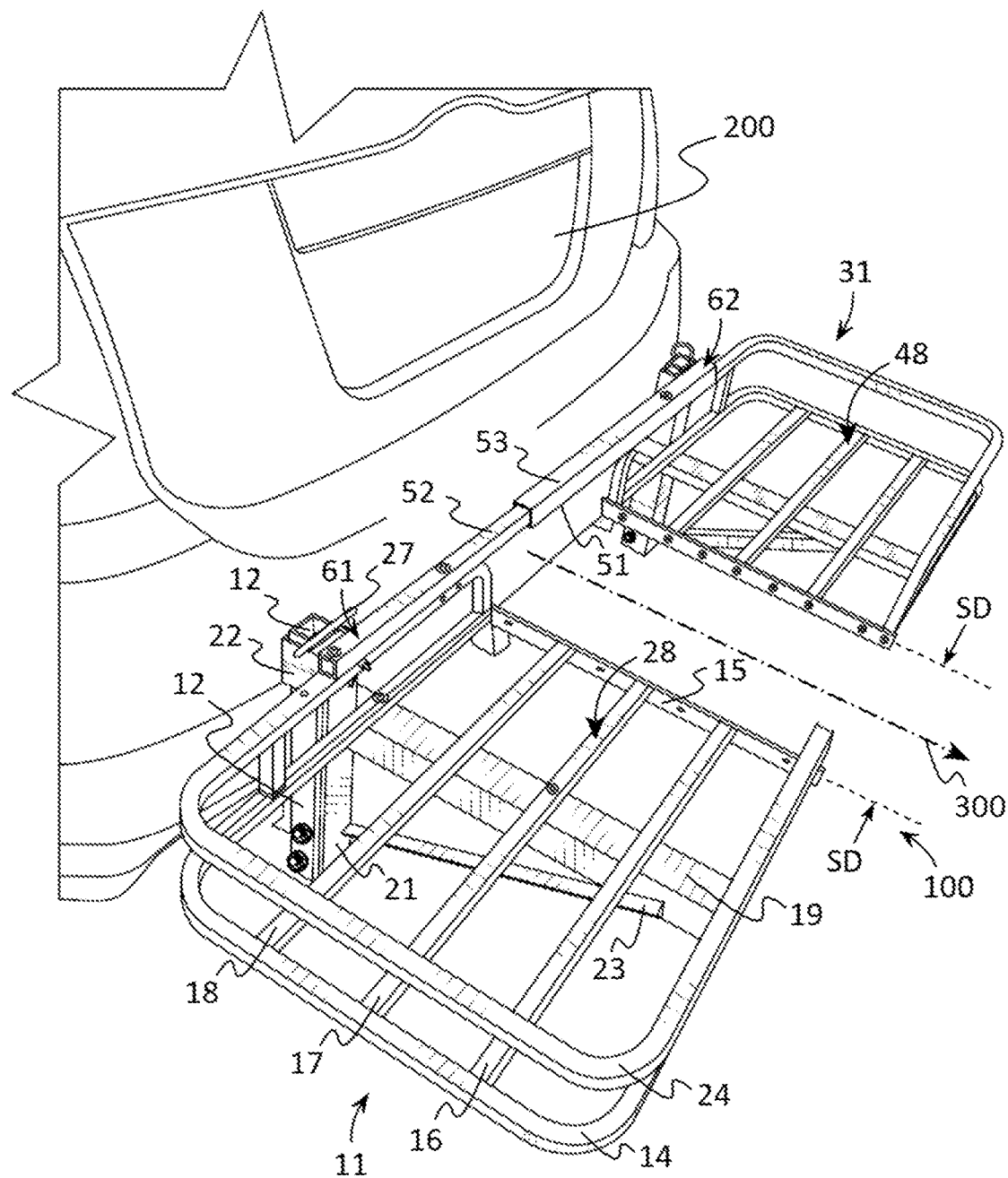
FIG. 1 depicts a perspective left view of an example of a vehicle cargo carrier device according to various embodiments described herein.

For purposes of description herein, the terms "upper," "lower," "left," "right," "rear," "front," "side," "vertical," "horizontal," and derivatives thereof shall relate to the invention as oriented in FIG. 1. However, one will understand that the invention may assume various alternative orientations and step sequences, except where expressly specified to the contrary. Therefore, the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Although the terms "first," "second," etc. are used herein to describe various elements, these elements should not be limited by these terms. These terms are only used to distinguish one element from another element. For example, the first element may be designated as the second element, and the second element may be likewise designated as the first element without departing from the scope of the invention.

As used in this application, the term "about" or "approximately" refers to a range of values within plus or minus 10% of the specified number. Additionally, as used in this application, the term "substantially" means that the actual value is within about 10% of the actual desired value, particularly within about 5% of the actual desired value and especially within about 1% of the actual desired value of any variable, element or limit set forth herein.

A new vehicle cargo carrier device is discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

Figure 2:
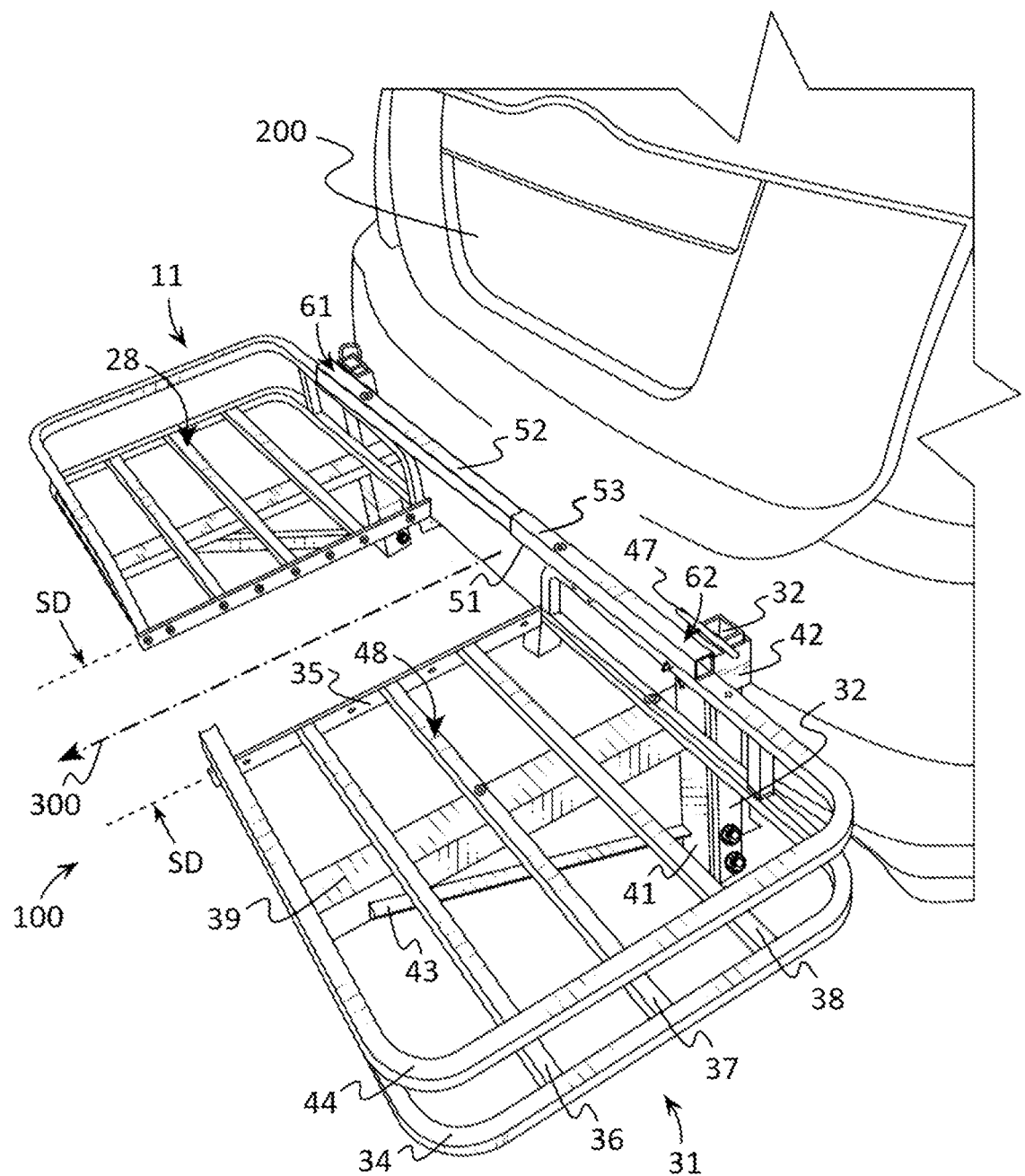
FIG. 2 illustrates a perspective right side view of an example of a vehicle cargo carrier device according to various embodiments described herein.
Figure 3:
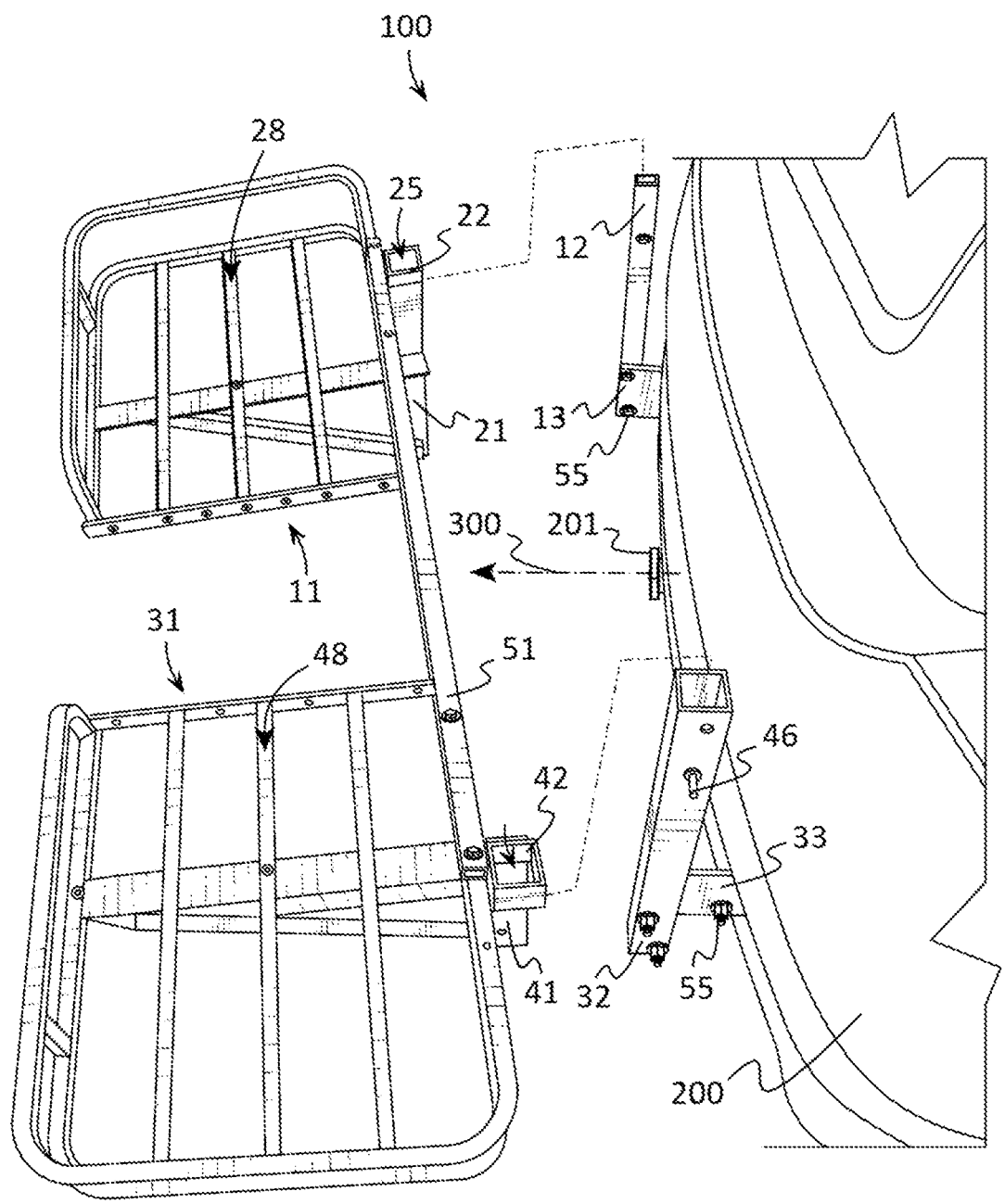
FIG. 3 shows a partially exploded, perspective view of an example of a vehicle cargo carrier device according to various embodiments described herein.

The present invention will now be described by example and through referencing the appended figures representing preferred and alternative embodiments. FIGS. 1-3 illustrate an example of a vehicle cargo carrier device ("the device") 100 according to various embodiments. In some embodiments, the device 100 may comprise a first support platform 11, having a first support surface 28, and a second support platform 31, having a second support surface 48, which may be coupled together via a connection bar 51. The first support platform 11 may also be coupled to a first vertical support arm 12, and the second support platform 31 may also be coupled to a second vertical support arm 32. Optionally, the support platforms 11, 31, may be removably coupled to their respective vertical support arms 12, 32. A first arm bracket 13 may be configured to couple the first vertical support arm 12 to a first portion of a vehicle 200, such as to a first portion of the vehicle frame, preferably by being coupled to a first support arm 202 of a vehicle hitch receiver 201 that is coupled to the rear vehicle frame, and a second arm bracket 33 may be configured to couple the second vertical support arm 32 to a second portion of the vehicle 200, such as to a second portion of the vehicle frame, preferably by being coupled to a second support arm 203 of a vehicle hitch receiver 201 that is coupled to the rear vehicle frame. Preferably, the arm brackets 13, 33, may be coupled to the vehicle so that the arm brackets 13, 33, are positioned apart from the center of the vehicle 200 and any hitch receiver 201 that may be coupled to center of the vehicle and so that the support platforms 11, 31, may be separated from each other by a desired distance. Optionally, the connection bar 51 may be adjustable in length so as to allow the arm brackets 13, 33, to be coupled various distances from the geometric centerline of the vehicle 300 (FIGS. 1-3) and from any hitch receiver 201 that may be coupled to center of the vehicle 200 along the geometric centerline of the vehicle 300.

Figure 6:
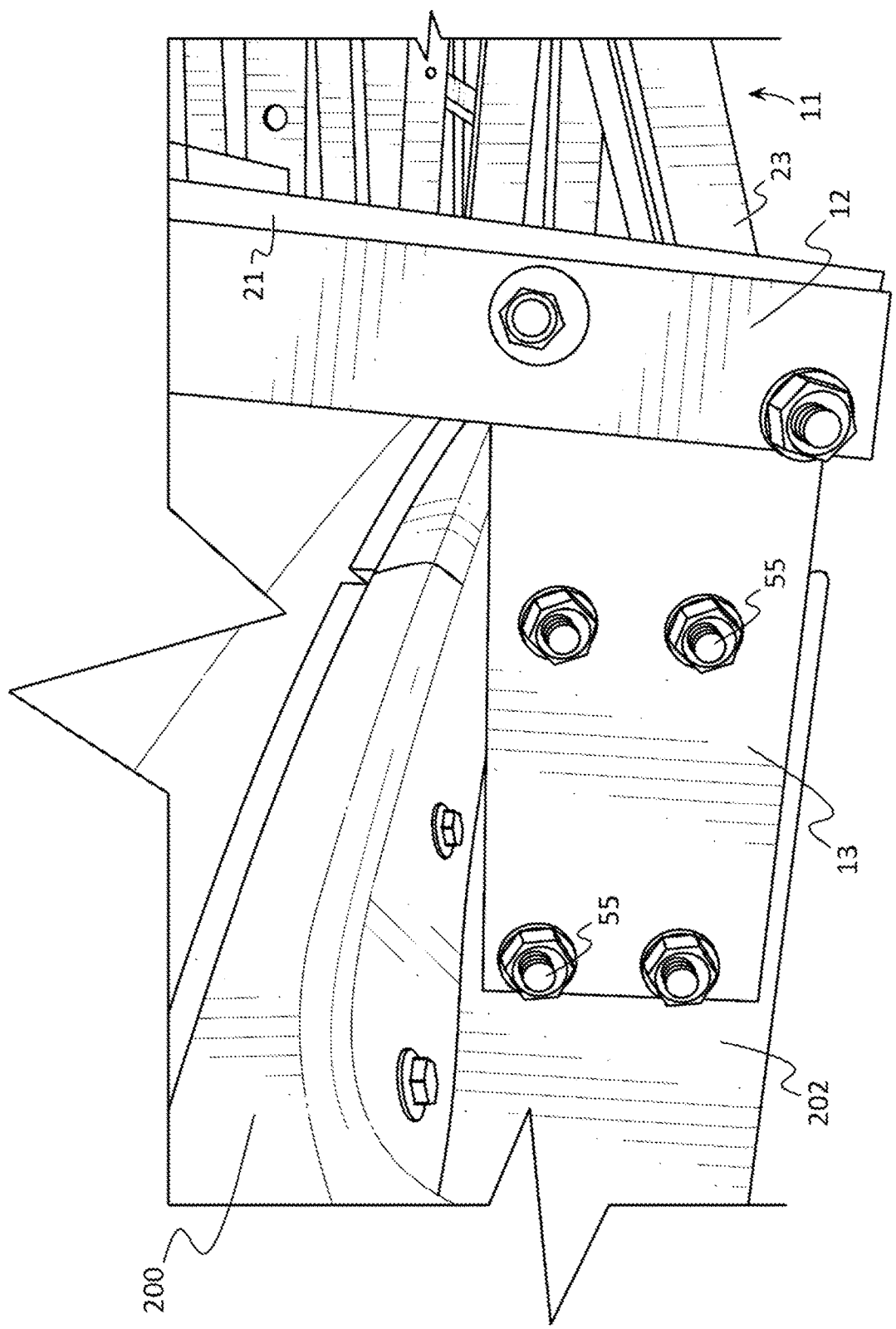
FIG. 6 shows a partial bottom perspective view of a first side of an example of a vehicle cargo carrier device and typically is attached to vehicle's receiver hitch support arms according to various embodiments described herein.
Figure 7:
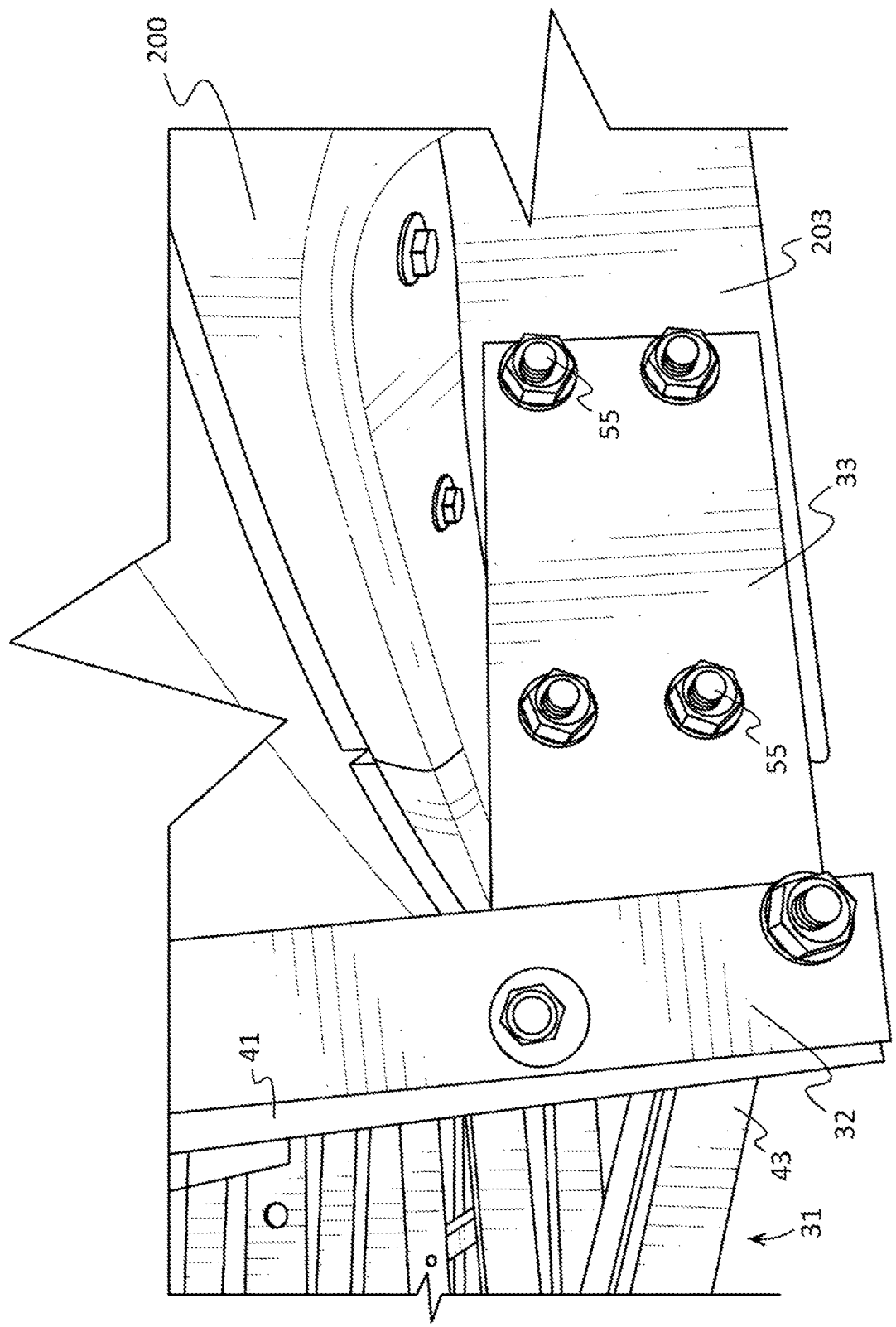
FIG. 7 depicts a partial bottom perspective view of a second side of an example of a vehicle cargo carrier device and typically is attached to vehicle's receiver hitch support arms according to various embodiments described herein.

The device 100 may comprise one or more arm brackets 13, 33, which may be configured to couple the device 100 to a vehicle 200. Optionally, arm brackets 13, 33, may be coupled directly to the frame of a vehicle 200 or indirectly coupled to the frame by being coupled to support arms 202, 203, of a vehicle hitch receiver 201 that is coupled to the frame of a vehicle 200. Arm brackets 13, 33, may be configured in any shape and size so that they may be coupled directly or indirectly to any portion of a vehicle 200. In preferred embodiments, and as shown in FIGS. 6 and 7, an arm bracket 13, 33, may be configured as a plate, or any other type of bracket, that may be coupled to a rear portion of the frame, such as a rear bulkhead, rear cross member, etc., and more preferably by being coupled to support arms 202, 203, of a vehicle hitch receiver 201 that is coupled to the rear vehicle frame of a vehicle 200 with one or more fasteners 55, such as nuts, bolts, screws, rivets, welding, etc. In further embodiments, an arm bracket 13, 33, may be configured with a rectangular prism shape which may enable the arm bracket 13, 33, to be received in a vehicle hitch receiver 201. In still further embodiments, an arm bracket 13, 33, may be configured to be coupled to a front portion of the frame, such as a front bulkhead, front cross member, etc., of a vehicle 200 with one or more fasteners 55. Preferably, an arm bracket 13, 33, may be made from or may comprise aluminum, steel, other metals and alloys, carbon fiber, or any other suitable structural material.

In some embodiments, arm brackets 13, 33, may be configured to be coupled to a front portion of a vehicle's frame on opposing sides of the geometric centerline of the vehicle 300 so that the device 100 may be coupled to the front of a vehicle 200 while still allowing access to front access doors, such as a vehicle hood, and front engine compartments which tend to be positioned and centered with the geometric centerline of the vehicle 300. Generally, the geometric centerline 300 (viewed from above the vehicle) is an imaginary line drawn from the center of the rear axle to the center of the front axle. This line simply follows the centerline of the vehicle chassis or frame of the vehicle 200, from the halfway point between the rear wheels to the halfway point between the front wheels.

In preferred embodiments, arm brackets 13, 33, may be configured to be coupled to a rear portion of a vehicle's frame, and more preferably by being coupled to support arms 202, 203, of a vehicle hitch receiver 201 that is coupled to the rear vehicle frame, on opposing sides of the geometric centerline of the vehicle 300 so that the device 100 may be coupled to the rear of a vehicle 200 while still allowing access to rear access doors, such as vehicle trunks, rear hatches, tailgates, etc., and allowing access to a receiver hitch that may be centrally located on the rear of the vehicle 200 which tend to be positioned and centered with the geometric centerline of the vehicle 300. For example, the device 100 may comprise a first arm bracket 13 that may couple a first vertical support arm 12 to a first portion of the vehicle frame, preferably by being coupled to a first support arm 202 of a vehicle hitch receiver 201 that is coupled to the rear vehicle frame that is left of the geometric centerline 300 of a vehicle 200, and a second arm bracket 33 that may couple a second vertical support arm 32 to a second portion of the vehicle frame of a vehicle 200, preferably by being coupled to a second support arm 203 of a vehicle hitch receiver 201 that is coupled to the rear vehicle frame that is right of the geometric centerline 300, thereby positioning the arm brackets 13, 33, apart from the geometric centerline 300 of the vehicle 200 and any hitch receiver 201 that may be coupled to the rear center of the vehicle 200.

The device 100 may comprise one or more vertical support arms 12, 32, which may be configured to couple a support platform 11, 31, to an arm bracket 13, 33. Vertical support arms 12, 32, may be configured in any size and shape so as to position a support platform 11, 31, a desired distance and orientation from an arm bracket 13, 33, that it is coupled to. Preferably, a vertical support arm 12, 32, may extend above the arm bracket 13, 33, that it is coupled to. For example, a vertical support arm 12, 32, may comprise a length of rectangular tubing which may be between approximately six inches and three feet in length. In further embodiments, a vertical support arm 12, 32, may comprise a curved, angled, or other shape and length. A vertical support arm 12, 32, may be coupled to an arm bracket 13, 33, with one or more fasteners 55, such as nuts, bolts, screws, rivets, welding, etc. Preferably, a vertical support arm 12, 32, may be made from or may comprise aluminum, steel, other metals and alloys, carbon fiber, or any other suitable structural material.

The device 100 may comprise one or more support platforms 11, 31, which may be coupled to a vehicle 200, via one or more vertical support arms 12, 32, and arm brackets 13, 33. Generally, a first support platform 11 may provide one or more first support surfaces 28 and a second support platform 31 may provide one or more second support surfaces 48 in which the support surfaces 28, 48, may be used for supporting and contacting objects, such as cargo, that may be supported by the device 100.

In some embodiments, the device 100 may comprise a separation distance (SD), as shown in FIGS. 1 and 2, which may describe the closest distance between the one or more first support surfaces 28 of the first support platform 11 and the one or more second support surfaces 48 of the second platform 31. In preferred embodiments, the geometric centerline of the vehicle 300 may extend through the SD. In further embodiments, the SD may be between one inch and 36 inches.

Support platforms 11, 31, may be configured in any size and shape which may allow the support platforms 11, 31, to provide one or more support surfaces 28, 48, for supporting and contacting objects, such as cargo, that may be supported by the device 100. In some embodiments, and as perhaps best shown in FIGS. 1-3, support platforms 11, 31, may comprise a generally rectangular shape so as to provide a generally rectangular area or support surfaces 28, 48, for supporting objects. For example, a first support platform 11 may comprise a first perimeter rail 14 and a first longitudinal brace 15 which may be coupled together in a generally rectangular shape. One or more first lateral braces 16, 17, 18, may be coupled to and extend between the first perimeter rail 14 and first longitudinal brace 15, and the one or more first lateral braces 16, 17, 18, may form one or more first support surfaces 28 for supporting objects on the first support platform 11. Optionally, a first lateral brace 16, 17, 18, may have two opposing ends with each end coupled to the first perimeter rail 14, such as by be parallelly orientated to a first longitudinal brace 15. Optionally, a first platform support arm 19 and/or a first longitudinal brace 15 may be shaped and positioned to form a first support surface 28. A first platform support arm 19 may be coupled to and/or placed in contact with one or more of the first perimeter rail 14 and first lateral braces 16, 17, 18, and the first platform support arm 19 preferably may be coupled to a first vertical brace 21.

Optionally, the first support platform 11 may comprise one or more first vertical extension rails 24 which may be coupled to the first perimeter rail 14 and/or other element of the first support platform 11, and the first vertical extension rails 24 may be positioned above the first perimeter rail 14 and first lateral braces 16, 17, 18, and the one or more first support surfaces 28, to function as a guide rail for preventing objects from sliding off of the first support platform 11.

In preferred embodiments, the elements of a second support platform 31 may be configured to generally mirror the elements of the first platform 11. Generally, a second support platform 31 may comprise a second perimeter rail 34 and a second longitudinal brace 35 which may be coupled together in a generally rectangular shape. One or more second lateral braces 36, 37, 38, may be coupled to and extend between the second perimeter rail 34 and second longitudinal brace 35, and the one or more second lateral braces 36, 37, 38, may form one or more second support surfaces 48 which may be used for supporting objects on the second platform 31. Optionally, a second lateral brace 36, 37, 38, may have two opposing ends with each end coupled to the second perimeter rail 34, such as by be parallelly orientated to a second longitudinal brace 35. Optionally, a second platform support arm 39 and/or a second longitudinal brace 35 may be shaped and positioned to form a second support surface 48. A second platform support arm 39 may be coupled to and/or placed in contact with one or more of the second perimeter rail 34 and second lateral braces 36, 37, 38, and the second platform support arm 39 preferably may be coupled to a second vertical brace 41.

Optionally, the second support platform 31 may comprise one or more second vertical extension rails 44 which may be coupled to the second perimeter rail 34 and/or other element of the second support platform 31 and which may be positioned above the second perimeter rail 34 and second lateral braces 36, 37, 38, and the one or more second support surfaces 48, to function as a guide rail for preventing objects from sliding off of the second support platform 31.

In other embodiments, a support platform 11, 31, may be configured in a triangular shape, circular shape, pentagonal shape, or with any other shape, with one or more perimeter rails 14, 34, longitudinal braces 15, 35, lateral braces 16, 17, 18, 36, 37, 38, and/or platform support arms 19, 39, configured in any size and shape and coupled together in any orientation via one or more fasteners 55, welding, or any other suitable coupling method so as to form a support platform 11, 31, of any size and shape.

Figure 4:
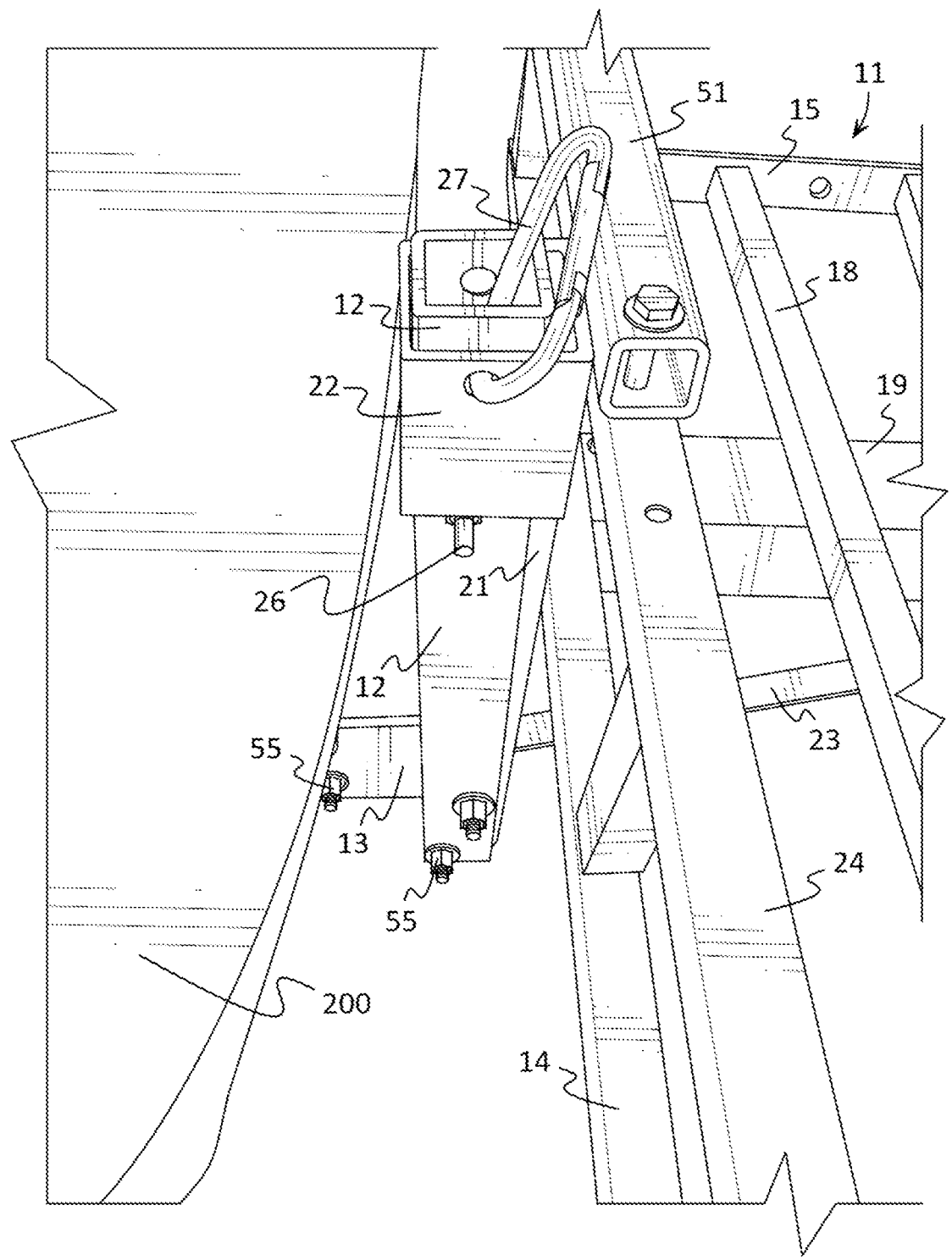
FIG. 4 depicts a partial top perspective view of a first side of an example of a vehicle cargo carrier device according to various embodiments described herein.
Figure 5:
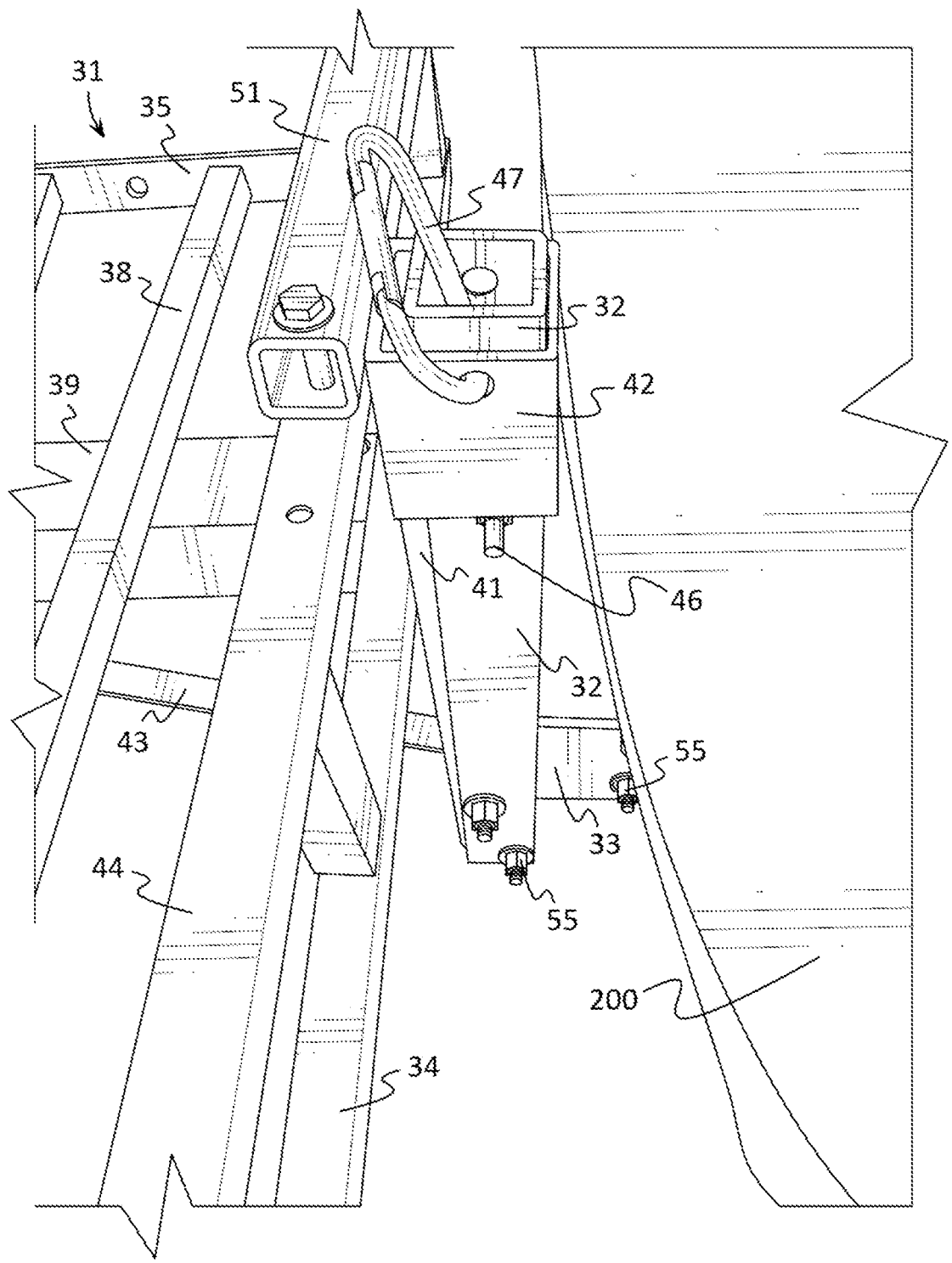
FIG. 5 illustrates a partial top perspective view of a second side of an example of a vehicle cargo carrier device according to various embodiments described herein.

Each support platform 11, 31, may be coupled to at least one vertical support arm 12, 32. Any suitable coupling method may be used to couple a support platform 11, 31, to a vertical support arm 12, 32. In some embodiments, a support platform 11, 31, may be movably coupled or repositionably coupled to a vertical support arm 12, 32, so that the support platform 11, 31, may be moved or repositioned relative to the vertical support arm 12, 32. In preferred embodiments, a support platform 11, 31, may be removably coupled to a vertical support arm 12, 32, so that the support platform 11, 31, may be attached and detached from the vertical support arm 12, 32. In further preferred embodiments, a first platform support arm 19 or other element of a first support platform 11 may be coupled to a first vertical brace 21. A first platform guide bracket 22 may be coupled to an upper portion of the first vertical brace 21, and the first vertical brace 21 may be elongated and extend away from the first platform guide bracket 22 with the first arm bracket 13 coupled to the lower portion of the first vertical brace 21. A first platform brace 23 may be coupled to a portion of the first platform support arm 19 distal to the first vertical brace 21 and to a lower portion of the first vertical brace 21. The first platform guide bracket 22 may comprise a first guide aperture 25 that a portion of the first vertical support arm 12 may fit into, and the first vertical brace 21 may optionally contact and rest against the first vertical support arm 12 when the first support platform 11 is coupled to the first vertical support arm 12. A first projection 26 may arrest the first platform guide bracket 22 position relative to the first vertical support arm 12, and a first removable bracket fastener 27, such as a carabiner, screw, bolt, etc., may be used to also removably couple or lock the first platform guide bracket 22 to the first vertical support arm 12 so that a portion of the first vertical support arm 12 may be removably coupled within the first guide aperture 25 as perhaps best shown in FIGS. 4 and 5. Likewise, a second platform support arm 39 or other element of a second support platform 31 may be coupled to a second vertical brace 41. A second platform guide bracket 42 may be coupled to an upper portion of the second vertical brace 41, and the second vertical brace 41 may be elongated and extend away from the second platform guide bracket 42 with the second arm bracket 33 coupled to the lower portion of the second vertical brace 41. A second platform brace 43 may be coupled to a portion of the second platform support arm 39 distal to the second vertical brace 41 and to a lower portion of the second vertical brace 41. The second platform guide bracket 42 may comprise a second guide aperture 45 that a portion of the second vertical support arm 32 may fit into, and the second vertical brace 41 may optionally contact and rest against the second vertical support arm 42 when the second support platform 31 is coupled to the second vertical support arm 32. A second projection 46 may arrest the second platform guide bracket 42 position relative to the second vertical support arm 32, and a second removable bracket fastener 47, such as a carabiner, screw, bolt, etc., may be used to also removably couple or lock the second platform guide bracket 42 to the second vertical support arm 32 so that a portion of the second vertical support arm 32 may be removably coupled within the second guide aperture 45.

In preferred embodiments, the support platforms 11, 31, may be easily coupled to the vertical support arms 12, 32, by placing a vertical support arm 12, 32, in a guide aperture 25, 45, and coupling a removable bracket fastener 27, 47, to both the vertical support arm 12, 32, and platform guide bracket 22, 42, thereby removably coupling the vertical support arms 12, 32, to the platform guide brackets 22, 42. Conversely, a support platform 11, 31, may be easily uncoupled from a vertical support arm 12, 32, by uncoupling the removable bracket fastener 27, 47, from the vertical support arm 12, 32, and platform guide bracket 22, 42, and by removing the vertical support arm 12, 32, from the guide aperture 25, 45.

In some embodiments, while one or more platform guide brackets 22, 42, may be used to secure a support platform 11, 31, to a vertical support arm 12, 32, a vertical brace 21, 41, may preferably rest against a portion of the length of a support arm 12, 32, to take some strain off of the platform guide bracket 22, 42, when the support platform 11, 31, is under load. In further embodiments, the device 100 may comprise one or more first platform braces 23 which may be coupled to one or more elements of the support platform 11, 31, such as a first platform support arm 19 and to a first vertical brace 21 to provide further load support to the first support platform 11 under load. In preferred embodiments, a first platform brace 23 may be coupled to the first support platform 11 below the one or more first support surfaces 28. In further preferred embodiments, a first platform brace 23 may be coupled to a first platform support arm 19, with the first platform support arm 19 positioned below the one or more first support surfaces 28, and to the first vertical brace 21. Likewise, the device 100 may comprise one or more second platform braces 43 which may be coupled to one or more elements of the support platform 31, such as a second platform support arm 39 and to a second vertical brace 41, to provide further load support to the second support platform 31 under load. In preferred embodiments, a second platform brace 43 may be coupled to the second support platform 31 below the one or more second support surfaces 48. In further preferred embodiments, a second platform brace 43 may be coupled to a second platform support arm 39, with the second platform support arm 39 positioned below the one or more second support surfaces 48, and to the first vertical brace 41.

In some embodiments, the device 100 may comprise one or more connection bars 51 which may be used to couple a first support platform 11 and a second support platform 31 together. A connection bar 51 may be coupled to any element of a support platform 11, 31, such as to a vertical extension rail 24, 44. Generally, a connection bar 51 may comprise a first end 61 and an opposing second end 62 with the first end 61 coupled to or proximate to one or more elements of the first support platform 11 and with the second end 62 coupled to or proximate to one or more elements of the second support platform 31. In preferred embodiments, a first end 61 may be coupled to a first vertical extension rail 24 and a second end 62 may be coupled to a second vertical extension rail 44. In further embodiments, a first end 61 may be coupled to a first perimeter rail 14, a first vertical brace 21, a first platform brace 23, and/or a first longitudinal brace 15. In still further embodiments, a second end 62 may be coupled to a second perimeter rail 34, a second vertical brace 41, a second platform brace 43, and/or a second longitudinal brace 35.

In preferred embodiments, a connection bar 51 may be adjustable in length so as to allow the support platforms 11, 31, to be positioned various distances from each other, such as to allow the device 100 to accommodate a range of separation distances (SD), while still allowing the support platforms 11, 31, to be coupled together via the connection bar 51. For example, a connection bar 51 may comprise a first bar section 52, forming the first end 61, and a second bar section 53, forming the second end 62, and a portion of the first bar section 52 may be slidably received in a portion of the second bar section 53 in a telescoping manner so that the SD may be adjustable or selectable in a plurality of distances. In other embodiments, a connection bar 51 may comprise two or more bar sections 52, 53, which may be selectively coupled together to form connection bar 51 of two or more lengths so that the SD may be adjustable or selectable in two or more discrete distances.

While some exemplary shapes and sizes have been provided for elements of the device 100, it should be understood to one of ordinary skill in the art that the support platforms 11, 31, vertical support arms 13, 33, arm brackets 13, 33, connection bar 51, and any other element described herein may be configured in a plurality of sizes and shapes including "T" shaped, "X" shaped, square shaped, rectangular shaped, cylinder shaped, cuboid shaped, hexagonal prism shaped, triangular prism shaped, or any other geometric or non-geometric shape, including combinations of shapes. It is not intended herein to mention all the possible alternatives, equivalent forms or ramifications of the invention. It is understood that the terms and proposed shapes used herein are merely descriptive, rather than limiting, and that various changes, such as to size and shape, may be made without departing from the spirit or scope of the invention.

In some embodiments, the device 100 may comprise one or more support platforms 11, 31, which may be movably coupled to a vertical brace 21, 41, or other element of the device 100 which may enable the one or more support platforms 11, 31, to be pivoted or otherwise moved. For example, if a vertical or large object(s) supported on a support platform 11, 31, obstructs access or opening of an access door, such as a rear hatch, rear door, trunk door, hood, etc., a user may use the movable coupling to move the support platform 11, 31, to gain access to the access door.

Any suitable coupling method may be used to movably couple a support platform 11, 31, to another element of the device 100. In some embodiments, the device 100 may be configured as a corner-hinged, swing-away carrier having two movable support platforms 11, 31, which may be movably and removably coupled to a support structure which is in turn coupled to the vehicle 200 via the vertical support arms 12, 32, and arm brackets 13, 33. For example, a support structure may comprise a rectangular shaped arrangement of aluminum tubing or bars that may be coupled to upper regions and lower regions of each vertical support arm 12, 32, with the rectangular shaped support structure extending past each vertical support arm 12, 32. Each support platform 11, 31, may be pivotally coupled, such as with a hinge, to a distal end of the rectangular shaped support structure and each support platform 11, 31, may be removably coupled to a vertical support arm 12, 32, or interior portion of the support structure, via a pin, threaded fastener, or other removable coupling device. When the removable coupling devices are not coupled to the support platforms 11, 31, the support platforms 11, 31, may be pivoted out and away from the center of the vehicle 200 via the pivotal couplings, and by pivoting the support platforms 11, 31, back to center and engaging the removable coupling devices, the support platforms 11, 31, may be locked into position. It should be understood that any combination of movably couplings, removable couplings, braces, plates, brackets, etc., may be used to enable a support platform 11, 31, to be pivoted out and away from the center of the vehicle 200.

Additionally, while some materials have been provided, in other embodiments, the elements that comprise the device 100 may be made from or may comprise durable materials, such as aluminum, steel, other metals and metal alloys, wood, hard rubbers, hard plastics, fiber reinforced plastics, carbon fiber, fiber glass, resins, polymers or any other suitable materials including combinations of materials. Additionally, one or more elements may be made from or may comprise durable and slightly flexible materials such as soft plastics, silicone, soft rubbers, or any other suitable materials including combinations of materials. In some embodiments, one or more of the elements that comprise the device 100 may be coupled or connected together with heat bonding, chemical bonding, adhesives, clasp type fasteners, clip type fasteners, rivet type fasteners, threaded type fasteners, other types of fasteners, or any other suitable joining method. In other embodiments, one or more of the elements that comprise the device 100 may be coupled or removably connected by being press fit or snap fit together, by one or more fasteners such as hook and loop type or Velcro® fasteners, magnetic type fasteners, threaded type fasteners, sealable tongue and groove fasteners, snap fasteners, clip type fasteners, clasp type fasteners, ratchet type fasteners, a push-to-lock type connection method, a turn-to-lock type connection method, a slide-to-lock type connection method or any other suitable temporary connection method as one reasonably skilled in the art could envision to serve the same function. In further embodiments, one or more of the elements that comprise the device 100 may be coupled by being one of connected to and integrally formed with another element of the device 100.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A vehicle cargo carrier device, the device comprising:
a first support platform having a first support surface;
a first arm bracket configured to be coupled to a first portion of a vehicle;
a first vertical support arm coupling the first arm bracket to the first support platform, wherein the first support platform comprises a first platform guide bracket, and wherein the first vertical support arm is removably coupled to the first platform guide bracket;
a second support platform having a second support surface;
a second arm bracket configured to be coupled to a second portion of the vehicle;
a second vertical support arm coupling the second arm bracket to the second support platform.

2. The device of claim 1, wherein the connection bar is adjustable in length.

3. The device of claim 1, wherein connection bar comprises a first bar section and a second bar section, and wherein a portion of the first bar section is slidably received in a portion of the second bar section in a telescoping manner.

4. The device of claim 1, wherein first support platform is removably coupled to the first vertical support arm.

5. The device of claim 4, wherein the first platform guide bracket comprises a first guide aperture, and wherein a portion of the first vertical support arm is removably coupled within the first guide aperture.

6. The device of claim 5, wherein a first removable bracket fastener removably couples the first vertical support arm to the first platform guide bracket.

7. The device of claim 5, further comprising a first vertical brace coupled to the first platform guide bracket, wherein the first vertical brace extends away from the first platform guide bracket, and wherein the first vertical brace contacts the first vertical support arm when the first support platform is coupled to the first vertical support arm.

8. The device of claim 7, further comprising a first platform brace coupled to the first platform guide bracket and to the first support platform, wherein the first platform brace is coupled to the first support platform below the first support surface.

9. The device of claim 8, wherein the first support platform comprises a first platform support arm, and wherein the first platform brace is coupled to the first platform support arm and to the first vertical brace.

10. The device of claim 1, wherein the first support platform comprises a first lateral brace that is coupled to a first perimeter rail, the first lateral brace forming the first support surface.

11. The device of claim 10, wherein the first support platform comprises a first vertical extension rail coupled to the first perimeter rail, and wherein the first vertical extension rail is positioned above the first support surface.

12. A vehicle cargo carrier device, the device comprising:
a first support platform having a first support surface;
a first arm bracket configured to be coupled to a first portion of a vehicle;
a first vertical support arm coupling the first arm bracket to the first support platform, wherein the first support platform comprises a first platform guide bracket having a first guide aperture, and wherein a portion of the first vertical support arm is removably received within the first guide aperture;
a second support platform having a second support surface;
a second arm bracket configured to be coupled to a second portion of the vehicle;
a second vertical support arm coupling the second arm bracket to the second support platform; and
a connection bar coupled to both the first support platform and the second support platform, wherein connection bar comprises a first bar section and a second bar section, and wherein a portion of the first bar section is slidably received in a portion of the second bar section in a telescoping manner so that the connection bar is adjustable in length.

13. The device of claim 12, wherein first support platform is removably coupled to the first vertical support arm.

14. The device of claim 13, wherein the portion of the first vertical support arm is removably coupled within the first guide aperture.

15. The device of claim 14, wherein a first removable bracket fastener removably couples the first vertical support arm to the first platform guide bracket.

16. The device of claim 14, further comprising a first vertical brace coupled to the first platform guide bracket, wherein the first vertical brace extends away from the first platform guide bracket, and wherein the first vertical brace contacts the first vertical support arm when the first support platform is coupled to the first vertical support arm.

17. The device of claim 16, further comprising a first platform brace coupled to the first vertical brace and to the first support platform, wherein the first platform brace is coupled to the first support platform below the first support surface.

18. The device of claim 17, wherein the first support platform comprises a first platform support arm, and wherein the first platform brace is coupled to the first platform support arm and to the first vertical brace.

19. The device of claim 12, wherein the first support platform comprises a first lateral brace that is coupled to a first perimeter rail, the first lateral brace forming the first support surface.

20. The device of claim 19, wherein the first support platform comprises a first vertical extension rail coupled to the first perimeter rail, and wherein the first vertical extension rail is positioned above the first support surface.

* * * * *